UNITED STATES PATENT OFFICE.

GEORGE Q. SMITH, OF CHICAGO, ILLINOIS, ASSIGNOR TO WILLIAM R. CLAYTON, OF CHICAGO, ILLINOIS.

EMBALMING FLUID.

1,215,210.                 Specification of Letters Patent.      Patented Feb. 6, 1917.

No Drawing.            Application filed May 19, 1916.   Serial No. 98,672.

*To all whom it may concern:*

Be it known that I, GEORGE Q. SMITH, a citizen of the United States, residing at Chicago, in the county of Cook and State of Illinois, have invented certain new and useful Improvements in Embalming Fluids, as set forth in the following specification.

This invention relates to embalming fluids and has for its object the provision of a fluid possessing distinct and novel advantages over fluids now commonly used in the art.

To insure proper penetration and to prevent drying of the tissue, embalming fluids now include a proportion of glycerin. Only a limited quantity of glycerin can be employed owing to its tendency to exude through the skin where it encourages the growth of mold which disfigures the body.

I have discovered as the result of numerous experiments that calcium chlorid possesses not only the penetrating properties necessary for embalming fluids but that it insures to a remarkable degree the retention of moisture in the tissue without the disagreeable tendency to exude through the skin. Furthermore, should sufficient calcium chlorid be employed to penetrate the skin the result will be the absolute exclusion of mold which can not live under such conditions. Calcium chlorid presents, furthermore, the additional advantage of acting as a powerful bleaching agent to remove surface discolorations frequently resulting from decomposition which sets in immediately following death.

Although the composition of my embalming fluid may be varied within wide limits while maintaining its advantages I set forth the following characteristic composition which has proven in practice to be peculiarly desirable.

A suitable embalming fluid comprises:

Formalin _____ 18 fluid ounces.
Denatured alcohol _____ 12.8 fluid ounces.
Water sufficient to provide 1 gallon of fluid.
Calcium chlorid _____ 12.5 ounces.

Although not essential it is customary to color the fluid with a suitable dye and for this purpose I add sufficient carmine to obtain the desired color which may vary with individual taste. Other dyes may be substituted, carmine being suggested merely as a suitable coloring agent in the particular composition set forth.

It will be understood that the novelty of my invention resides particularly in the discovery and use of calcium chlorid as an essential element of an embalming fluid. The formalin is employed for its preservative and antiseptic properties and is required by many State laws relating to embalming. The alcohol is used to assist the penetration of the fluid and also because of its preservative properties.

Embalming fluid made in accordance with my invention is not only less expensive than fluids containing glycerin but possesses advantages which cannot be obtained by the use of fluids containing glycerin.

Various changes may be made in the characteristic composition set forth in the foregoing specification without departing from the invention or sacrificing any of its material advantages, the composition set forth, as previously explained, being merely the preferred embodiment of the invention.

I claim:

1. An embalming fluid including calcium chlorid and formaldehyde.
2. An embalming fluid including calcium chlorid, formaldehyde and alcohol.
3. An embalming fluid including calcium chlorid, formaldehyde, alcohol, water, and a suitable coloring agent.

GEORGE Q. SMITH.

Witnesses:
ERNEST H. MERCHANT,
W. T. WESTERBERG.